(12) United States Patent
Zhang

(10) Patent No.: US 11,259,000 B2
(45) Date of Patent: Feb. 22, 2022

(54) SPATIOTEMPORAL CALIBRATION OF RGB-D AND DISPLACEMENT SENSORS

(71) Applicant: COGOSPREY VISION INC, Pleasanton, CA (US)

(72) Inventor: Yanxiang Zhang, Pleasanton, CA (US)

(73) Assignee: Lumierev Inc., Plano, TX (US)

( * ) Notice: Subject to any disclaimer, the term of this patent is extended or adjusted under 35 U.S.C. 154(b) by 0 days.

(21) Appl. No.: 16/025,399

(22) Filed: Jul. 2, 2018

(65) Prior Publication Data

US 2020/0007843 A1 Jan. 2, 2020

(51) Int. Cl.
| | |
|---|---|
| *H04N 13/128* | (2018.01) |
| *H04N 9/04* | (2006.01) |
| *G06T 7/80* | (2017.01) |
| *G06T 7/521* | (2017.01) |
| *H04N 13/257* | (2018.01) |
| *H04N 5/232* | (2006.01) |

(52) U.S. Cl.
CPC ........... *H04N 13/128* (2018.05); *G06T 7/521* (2017.01); *G06T 7/85* (2017.01); *H04N 5/23229* (2013.01); *H04N 9/045* (2013.01); *H04N 13/257* (2018.05); *G06T 2207/10024* (2013.01); *G06T 2207/30204* (2013.01)

(58) Field of Classification Search
CPC .............. H04N 13/128; H04N 13/257; H04N 5/23229; H04N 9/045; G06T 7/521; G06T 7/85
USPC ......................................................... 348/136
See application file for complete search history.

(56) References Cited

U.S. PATENT DOCUMENTS

2016/0345858 A1* 12/2016 Tromberg .............. A61B 5/067
2019/0000564 A1* 1/2019 Navab ..................... A61B 6/03

* cited by examiner

*Primary Examiner* — Nguyen T Truong
(74) *Attorney, Agent, or Firm* — Robinson IP Law, PLLC

(57) ABSTRACT

A method of calibrating an RGB-D device having an RGB-D camera and a displacement sensor includes: providing a calibration target, the calibration target including a plurality of visual markers shown in a surface of the calibration target, wherein the plurality of visual markers have known locations on the calibration target; positioning the calibration target within a field of view of the RGB-D device such that the RGB-D camera and displacement sensor capture data corresponding to the calibration target; moving the calibration target a known distance in relation to a location of the RGB-D device; receiving output data from the RGB-D device including data from the RGB-D camera and displacement sensor; aligning data from the RGB-D camera and data from the displacement sensor; calibrating a relative configuration of the RGB-D device based on aligned data output from the RGB-D device and known position information of the calibration target.

14 Claims, 5 Drawing Sheets

SPATIOTEMPORAL CALIBRATION OF RGB-D AND DISPLACEMENT SENSORS

FIELD

The present disclosure relates to a method and/or process for sensor calibration. In particular, the embodiments of the present disclosure relate to the calibration of visual and distance/depth sensors.

BACKGROUND

RGB-D sensors, or sensors that combine RGB color information with depth information, are devices that can provide color and depth information from a scene at the same time. RGB-D sensors have become popular in many applications for depth measurement and 3D modeling. The two major principles of RGB-D sensors are time of flight (ToF) and structured light (SL). Other sensors widely used in industrial measurement and manufacturing are displacement sensors such as laser displacement sensors (LDS). The displacement sensors provide non-contact, high accuracy, and high measurement speed. Combining an RGB-D camera with a displacement sensor is one of the most flexible and cost-effective approach to obtaining colorized 3D point clouds with accurate depth measurement. The limitation of a displacement sensor is that it can only measure the distance to a point.

Several methods exist for calibration of a 2D laser scanner with respect to a camera, calibration for stereo vision sensors, calibration of intrinsic and extrinsic parameters of an RGB-D sensor, and calibration of a 3D range sensor and a camera. But there lacks an effective method to calibrate an RGB-D camera and a displacement sensor.

What is needed is a method to compute the temporal and spatial relations between an RGB-D camera and a displacement sensor, including translation and rotation.

SUMMARY

The above and other needs are met by a method of calibrating an RGB-D device. It is an object of the invention of the preset disclosure to provide a calibration method that finds a relative configuration of an imaging sensor and a displacement sensor, including relative position and attitude.

In a first aspect, a method of calibrating an RGB-D device having an RGB-D camera and a displacement sensor includes: providing a calibration target, the calibration target including a plurality of visual markers shown in a surface of the calibration target, wherein the plurality of visual markers have known locations on the calibration target; positioning the calibration target within a field of view of the RGB-D device such that the RGB-D camera and displacement sensor capture data corresponding to the calibration target; moving the calibration target a known distance in relation to a location of the RGB-D device; receiving output data from the RGB-D device including data from the RGB-D camera and displacement sensor; align data from the RGB-D camera and data from the displacement sensor; calibrate a relative configuration of the RGB-D device based on aligned data output from the RGB-D device and known position information of the calibration target.

In one embodiment, the method further includes rotating the calibration target a known amount in relation to an orientation of the RGB-D device and further calibrating a relative configuration of the RGB-D device based on the known change of rotation of the calibration target.

In another embodiment, the method includes calibrating intrinsic camera parameters and lens distortion of the RGB-D device based on known locations of the visual markers on the calibration target.

In yet another embodiment, aligning data from the RGB-D camera and data from the displacement sensor includes interpolating measurements of one of the RGB-D camera and displacement sensor.

In one embodiment, the plurality of visual markers on the calibration target are arranged in an array or known positions. In another embodiment, the plurality of visual markers are shaped having a corner for ready identification of the visual markers by the RGB-D device.

In a second aspect, a method of calibrating an RGB-D device having an RGB-D camera and a displacement sensor includes: providing a calibration target, the calibration target including a plurality of visual markers shown in a surface of the calibration target, wherein the plurality of visual markers has known locations on the calibration target; positioning the calibration target within a field of view of the RGB-D device such that the RGB-D camera and displacement sensor capture data corresponding to the calibration target; moving and rotating the calibration target a known distance in relation to a location of the RGB-D device; receiving output data from the RGB-D device including data from the RGB-D camera and displacement sensor; align data from the RGB-D camera and data from the displacement sensor; calibrating intrinsic camera parameters and lens distortion of the RGB-D device based on known locations of the visual markers on the calibration target; calibrate a relative configuration of the RGB-D device based on aligned data output from the RGB-D device and known position information of the calibration target.

In one embodiment, aligning data from the RGB-D camera and data from the displacement sensor includes interpolating measurements of one of the RGB-D camera and displacement sensor.

In another embodiment, the plurality of visual markers on the calibration target are arranged in an array or known positions. In yet another embodiment, the plurality of visual markers are shaped having a corner for ready identification of the visual markers by the RGB-D device.

In a third aspect, a method of calibrating an RGB-D device having an RGB-D camera and a displacement sensor includes: providing a calibration target, the calibration target including a plurality of visual markers shown in a surface of the calibration target, wherein the plurality of visual markers has known locations on the calibration target; positioning the calibration target within a field of view of the RGB-D device such that the RGB-D camera and displacement sensor capture data corresponding to the calibration target; locating one or more corners of the calibration target with the RGB-D device; locating a projected measuring point of the displacement sensor projected onto the calibration target; rotating the calibration target by a defined rotation amount and recording output data from the RGB-D device corresponding to rotation of the calibration target; and solving an optimization problem of parameters of the RGB-D device to determine a relative relationship of the RGB-D device.

In one embodiment, the method further includes moving and rotating the calibration target and receiving data from the RGB-D device corresponding to additional movement and rotation of the RGB-D device.

In another embodiment, the plurality of visual markers on the calibration target are arranged in an array or known positions. In yet another embodiment, the plurality of visual markers are shaped having a corner for ready identification of the visual markers by the RGB-D device.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A system and method of dimension measurement is provided using an RGB-D sensor and a displacement sensor. The system and method measure a 3D dimension of a target object inside a working space as well as a color image. The system consists of an RGB-D camera, such as a stereovision camera, structure light or time-of-flight based depth camera, and a displacement sensor, such as a laser displacement sensor. The RGB-D camera outputs a color image and an associated depth for each pixel, while the displacement sensor measures the depth of an interested point with a measure of precision and accuracy in a scale of micrometers. The fusion of an RGB-D camera and a displacement sensor enable accurate dimension and depth measurement associated with high-resolution imaging.

Figure 1:
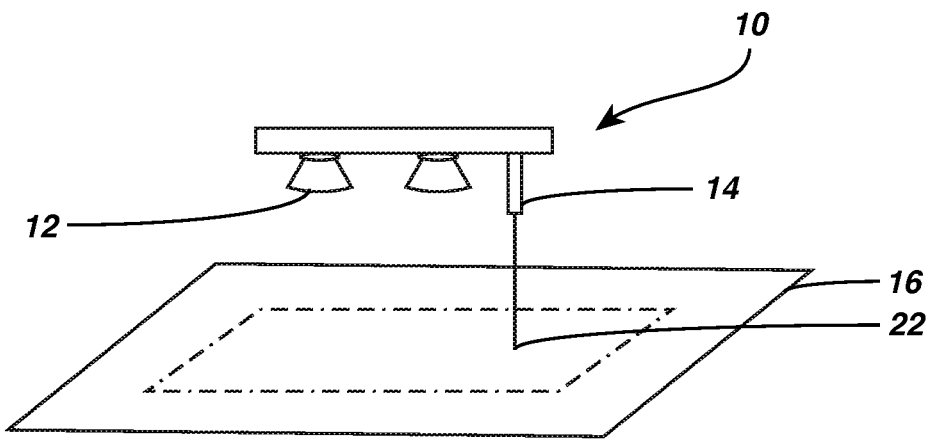
FIG. 1 is a diagram showing an example of the configuration of the RGB-D sensor and the displacement sensor according to one embodiment of the present disclosure.

The accuracy of dimension and depth measurement depends on the calibration of each sensor and the configuration of the sensors. One configuration of an RGB-D device 10 including an RGB-D camera 12 and a displacement sensor 14 is shown in FIG. 1. Calibration of the camera sensor computes intrinsic parameters of the camera system, including focal length, imaging sensor parameters, and lens distortion; the calibration of the configuration of the sensors resolves a relative relationship between the two sensors, including rotational and translational positions.

Figure 2:
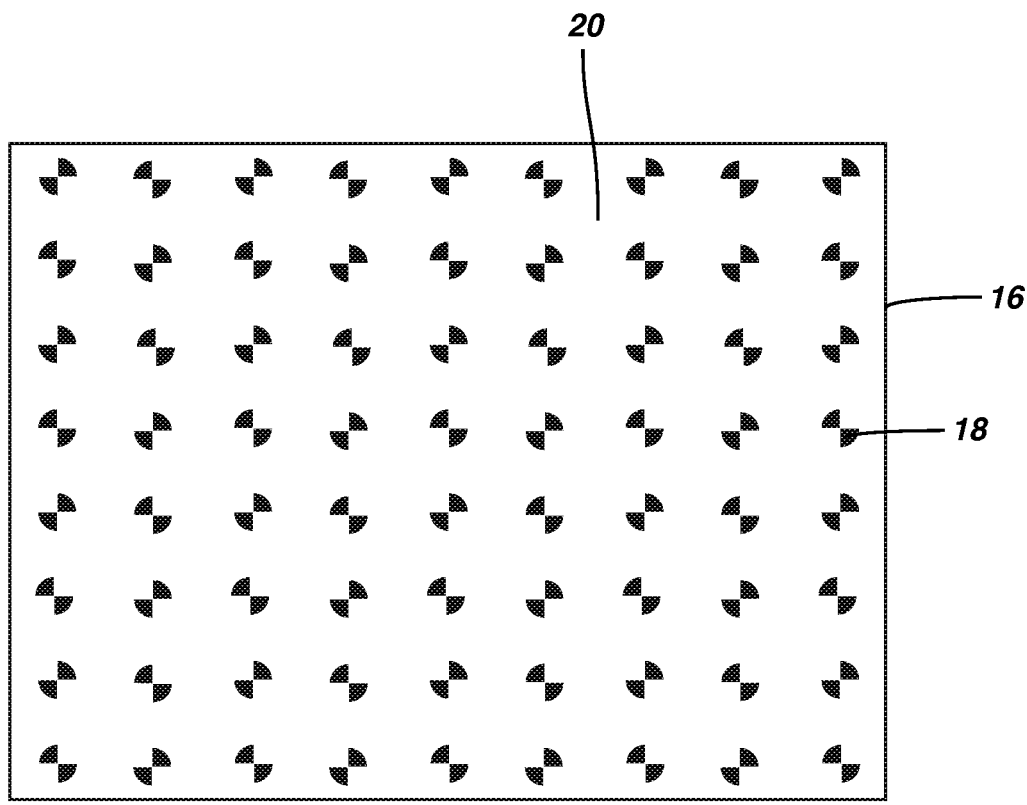
FIG. 2 is an example of the chessboard target for calibration according to one embodiment of the present disclosure.

Embodiments of the present disclosure include a method to calibrate the relative relationship between the RGB-D camera 12 and the displacement sensor 14. An example of a calibration target 16 is shown in FIG. 2. The calibration target 16 is preferably a planar object having a non-reflective surface. An array of visual markers 18 is printed on a surface of the calibration target 16, and distances between centers of the visual markers 18 are measurable and known. The visual markers 18 are particularly designed corner patterns for fast and accurate detection of the centers of the visual markers 18. Distances between the visual markers 18 may vary depending on specifications of the measurement system, and the number of visual markers 18 may also vary.

The visual markers 18 and the calibration target 16 are specially designed so that there is enough marker-free space 20 on the surface of the calibration target 16. The marker-free space 20 is used to precisely identify the position of a projected dot 22 from the displacement sensor 14. The marker-free space 20 helps improve identification of an area and region of the projected dot 22.

Figure 3:
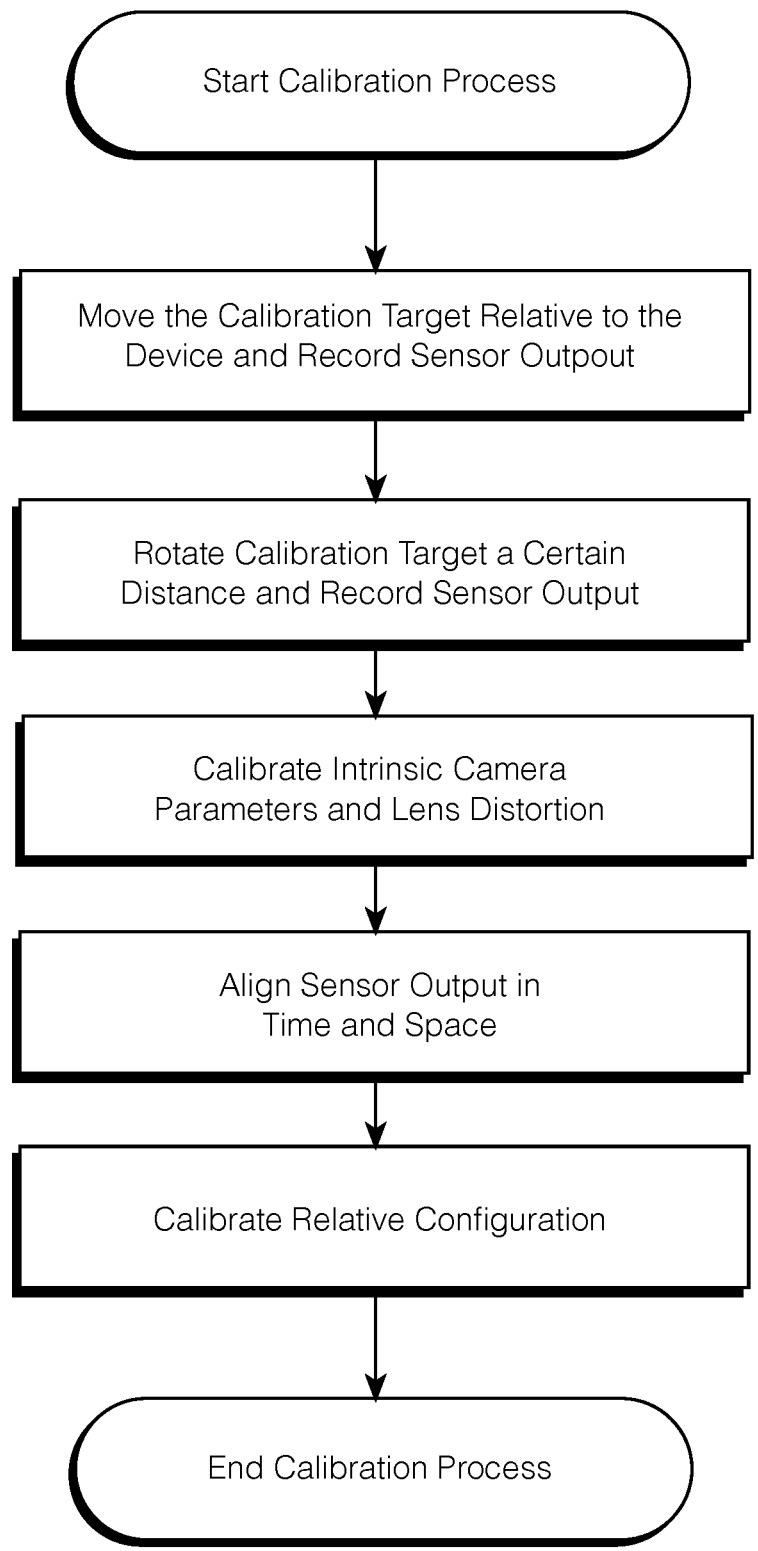
FIG. 3 is a diagram showing a general procedure of a calibration process according to one embodiment of the present disclosure.

The flowchart in FIG. 3 illustrates a calibration method according to one embodiment of the present disclosure. The calibration method may include at least the steps of: move the calibration target 16 and record sensor output; rotate the calibration target 16 and record sensor output; calibrate camera parameters, align recorded data; and calibrate relative configuration of the RGB-D camera 12 and the displacement sensor 14.

In a first step, the calibration target 16 is placed at different distances within a working range of the RGB-D 12 camera and the displacement sensor 14. An RGB image is captured by the RGB-D camera, and output data of the RGB image is recorded. A depth of the calibration target 16 captured by the RGB-D camera 12, and output data of the depth of the calibration target 16 is recorded. A distance between the displacement sensor 14 and the calibration target 16 captured by the displacement sensor 14 is measured, and data of the measured distance between the displacement sensor 14 and the calibration target 16 is recorded. Captured RGB image data includes the visual markers 18 on the calibration target 16 and the projected dot 22 of the displacement sensor 14.

In a second step, the calibration target 16 is placed at different angles relative to the device within the working range of the RGB-D camera 12 and the displacement sensor 14. The images of the calibration target 16, the depth of the calibration target 16, and distance between the displacement sensor 14 and the calibration target 16 are recorded when the calibration target 16 is rotated. The depth and images of the calibration target 16 are measured from different perspectives in different fields of view.

In a third step, intrinsic parameters of the RGB-D camera 12 and a lens of the RGB-D camera 12 are calibrated from the detected visual markers 18 on the calibration target 16. The visual markers 18 may be obtained using feature detection and image processing algorithms. Mapping of the visual markers 18 in a three-dimensional space represented in the camera's coordinate to the corresponding 2D point in the image plane is expressed by a pinhole model. A camera calibration process determines an intrinsic matrix, which corresponds to an internal camera parameter of the imaging process. Higher-ordered models that consider the lens distortion, including radial distortion and slight tangential distortion, may also applied for precise calibration. Through the calibration process, both the intrinsic parameters and the extrinsic parameters of the camera may be obtained. A relative pose including position and attitude between the camera and the calibration target 16 can be determined from the corresponding features of the calibration-target images.

According to 3D geometry, a minimal number of five feature points may be required to compute a pose of the camera relative to the feature points and therefore the calibration target. The performance of calibration will be significantly improved if more feature points are utilized for more accurate and robust calibration by using bundle adjustment technique.

In a fourth step, measurements of the RGB-D camera 12 and the displacement sensor 14 are aligned in time space as refreshing rates of the sensors are different, where an RGB-D camera usually has a frame rate of 100 Hz and a displacement sensor usually has a frame rate up to 5000 Hz. In addition, sampling timings of the sensors may be asynchronous unless a hardware synchronization mechanism is implemented. Therefore, gaps in the measurements are interpolated to simulate measurements at those timings. The RGB-D 10 device and the calibration target 16 are maintained at each measuring position.

Measurements of positions and depth are interpolated using linear interpolation methods as the RGB-D device 10 and the calibration target 16 are assumed to be stable for a short measuring time. Data points at sampling intervals between measurement points are constructed by a method of curve fitting using linear polynomials.

Measurements of rotation are synchronized and aligned in time space by means of quaternion interpolation. During a sampling interval, a rotating axis is assumed to be identical and angular velocity is assumed to be uniform. Therefore, a rotation measurement between two sampling points can be simulated using spherical linear quaternion interpolation (Slerp) interpolation. Given two measurements and a synchronization point, a Slerp algorithm generates an optimal interpolation curve between two rotations, yielding the shortest possible interpolation between two quaternions on a unit sphere. To interpolate in a series of rotation measurements, the quaternions cannot be interpolated in a pairwise manner whereby the interpolation curve is not smooth at the control points and the angular velocity is not continuous at the control points. In order to synchronize a series of quaternions, a Squad interpolation is utilized to simulate rotations between measurements. A Squad curve is essentially a spherical cubic equivalent of a Bezier curve that guarantees continuity.

Rotations observed by the displacement sensor 14 with a higher sampling speed are interpolated to align with sampling points of the RGB-D sensor 12 with a slower sampling speed. After interpolation at each synchronization time, two series of rotation measurements aligned in time are obtained, representing corresponding depth and position measurements.

Figure 4:
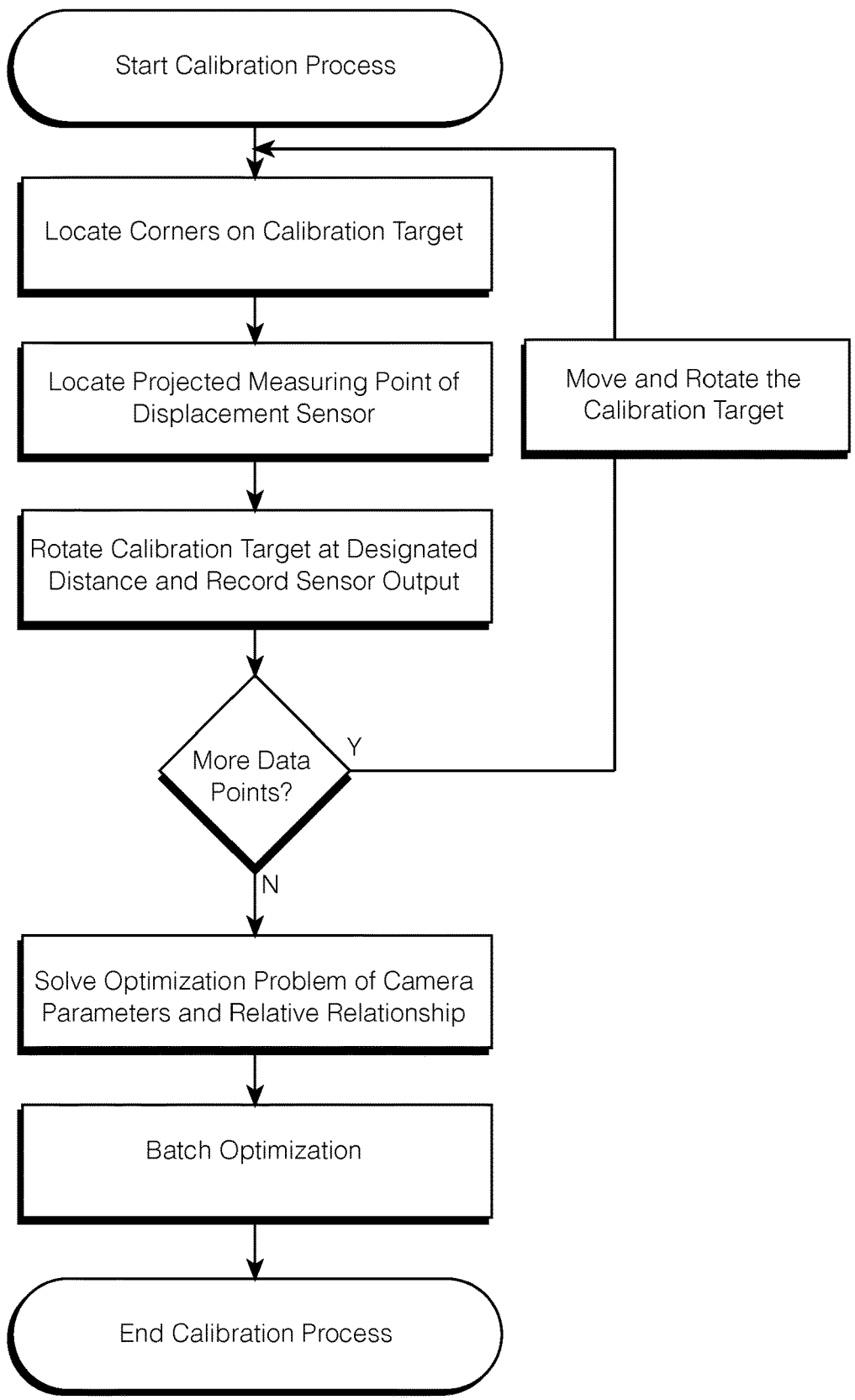
FIG. 4 is a diagram showing a calibration process of camera parameters and relationship between sensors according to one embodiment of the present disclosure.

In a fifth step, a relative configuration of the RGB-D camera 12 and the laser displacement sensor 14 are calibrated from the visual markers 18 on the calibration target 16 and the projected measuring point 22 of the displacement sensor 14. A calibration procedure of the relative configuration is shown in FIG. 4. The calibration of the relative configuration includes the following steps: locating corners on the calibration target 16 and the projected measuring point 22 of the displacement sensor 14, solving the optimizing problem of camera parameters and relative configuration, and performing batch optimization. During the process, more data points may be collected by moving and rotating the calibration target 16.

Corners on the calibration target 16 are located using corner detection and image processing algorithms. The calibration target 16 is assumed to be flat and the distances between the corners are measured and known. The locations of the visual markers 18 should lie on the same plane in the 3D space.

Figure 5:
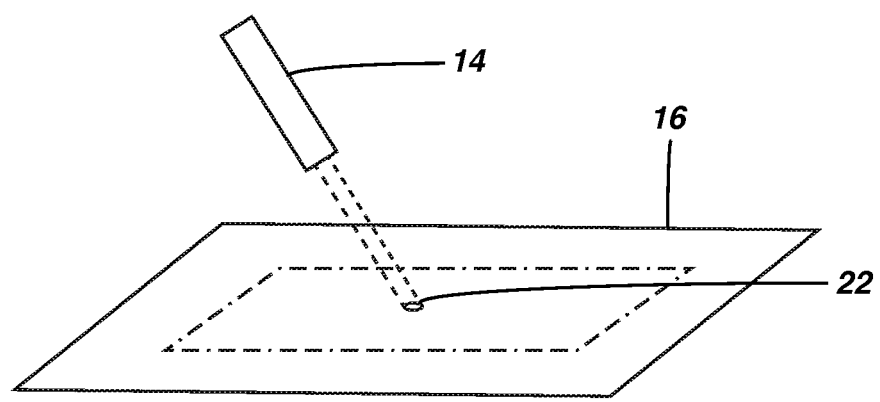
FIG. 5 is a chart showing a projected area of a laser point from a displacement sensor according to one embodiment of the present disclosure.

The projected measuring point 22 of the displacement sensor 14 is located by finding a center of the projected area. The shape of the projected area depends on the relative position and orientation of the displacement sensor 14 and the calibration target 16, ranging from an ellipse to a circle, as shown in FIG. 5.

The area of the projected measuring point 22 is detected by color analysis, e.g., the projection of the laser beam of a laser displacement sensor is usually a red spot. The region of the projected area is determined by color analysis in the hue, saturation, value ("HSV") color space instead of the RGB color space. In the HSV color space, color characteristics from the hue components are more readily identified, which correspond to different types of laser beams of displacement sensors. Influence of lighting intensity and ambient lighting conditions are modeled by the lightness components "V".

The extracted region of the projected measuring point is modeled using an ellipse model. The mean position of the pixels of the extracted region is computed, and the position of a center of the projected measuring point is extracted from all pixel positions in the region. The singular value decomposition of the centered pixel positions is performed to find rotation, scaling, and boundary points. Data points outsides the major area of the region are excluded from computing.

Parameters of the ellipse models are computed by fitting the positions of the pixels in the extracted region. The shape of the ellipse is modeled by nine parameters, which can be obtained by solving a series of equations of the pixel positions. The center of the ellipse is determined by the intersection of the long axis and short axis of the ellipse model.

Figure 6:
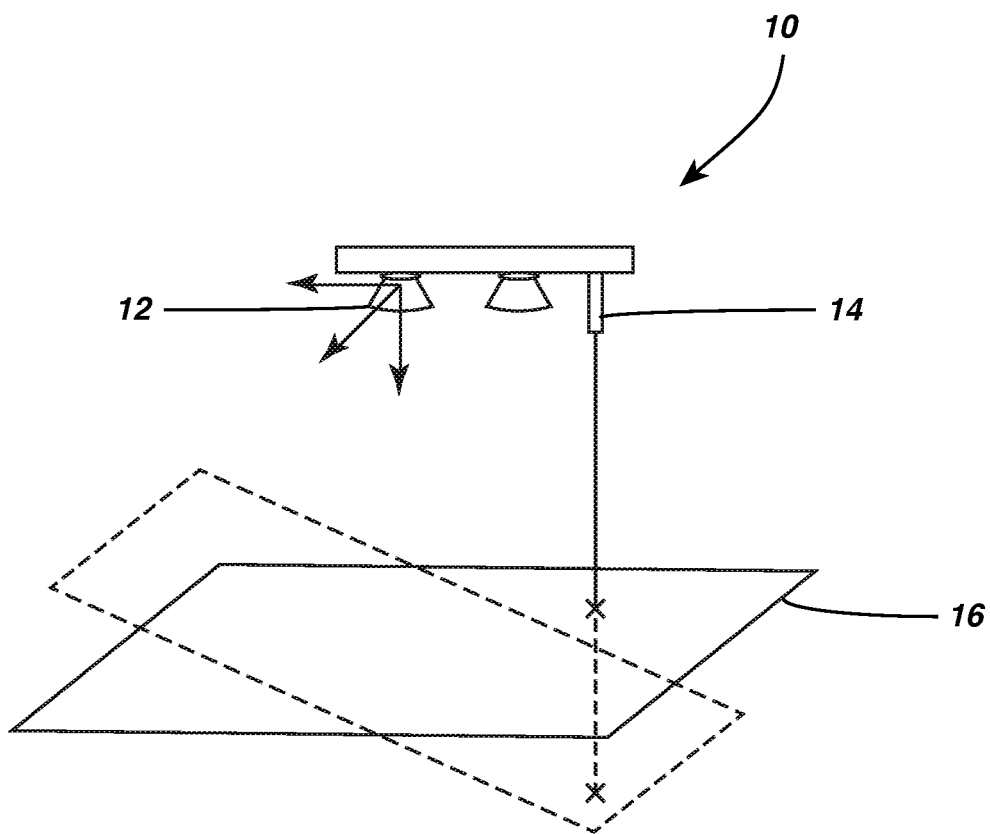
FIG. 6 is a chart showing a computation of relative configuration between an RGB-D sensor and a displacement sensor according to one embodiment of the present disclosure.

Computation of the relative configuration between the RGB-D sensor and the displacement sensor is given in FIG. 6. A reference frame is displayed to the camera 12. The position and orientation of the displacement sensor 14, and the position and orientation of the calibration target 16 is represented in the reference frame. From the located visual markers 18 on the calibration target 16, the position and orientation of the calibration target 16 can be determined inside the reference frame. By placing the calibration target at different positions and orientations in front of the device 10, the direction of the laser beam of the displacement sensor 14 can be determined from the series of the intersections of the laser beam and the plane of the calibration target 16. The distance from the intersections to the displacement sensor 14 is known from the measurement of the displacement sensor 14.

The position and orientation of the displacement sensor 14 are represented inside the reference frame attached to the camera 12 by using a homogeneous matrix. A group of linear equations are composed from the geometry of the pose of the calibration target 16, and intersections of the laser beam and plane of the calibration target 16. The relative configuration between the RGB-D sensor 12 and the displacement sensor 14 are computed from the linear equations through optimization.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of calibrating an RGB-D device comprising:
providing an RGB-D camera;
providing a displacement sensor located proximate to the RGB-D camera;
providing a calibration target, the calibration target including a plurality of visual markers shown in a surface of the calibration target and a marker-free area, wherein the plurality of visual markers have known locations on the calibration target;
positioning the calibration target within a field of view of the RGB-D camera and the displacement sensor such that the RGB-D camera and displacement sensor capture data corresponding to the calibration target;
projecting a measuring point on the marker-free area of the calibration target with the displacement sensor, the measuring point located within a field of view of the RGB-D camera on the calibration target;
identifying a position of the measuring point projected by the displacement sensor on the calibration target with the RGB-D camera;
moving the calibration target a known distance relative to the RGB-D camera and displacement sensor and in relation to a location of the RGB-D camera and the displacement sensor;
receiving output data from the RGB-D camera and the displacement sensor, the output data including depth measurements of the calibration target from both the RGB-D camera and the displacement sensor;
aligning data from the RGB-D camera and data from the displacement sensor;
calibrating a relative configuration of the RGB-D camera and the displacement sensor based on the aligned data output from the RGB-D device and position information of the calibration target output from the displacement sensor.

2. The method of claim 1, further comprising rotating the calibration target a known amount in relation to an orientation of the RGB-D device and further calibrating a relative configuration of the RGB-D device based on the known change of rotation of the calibration target.

3. The method of claim 1, further comprising calibrating intrinsic camera parameters and lens distortion of the RGB-D device based on known locations of the visual markers on the calibration target.

4. The method of claim 1, wherein aligning data from the RGB-D camera and data from the displacement sensor includes interpolating measurements of one of the RGB-D camera and displacement sensor.

5. The method of claim 1, wherein the plurality of visual markers on the calibration target are arranged in an array or known positions.

6. The method of claim 1, wherein the plurality of visual markers are shaped having a corner for ready identification of the visual markers by the RGB-D device.

7. A method of calibrating an RGB-D device having an RGB-D camera and a displacement sensor, the method comprising:
providing a calibration target, the calibration target including a plurality of visual markers shown in a surface of the calibration target and a marker-free area, wherein the plurality of visual markers has known locations on the calibration target;
positioning the calibration target within a field of view of the RGB-D device such that the RGB-D camera and displacement sensor capture data corresponding to the calibration target;
projecting a measuring area on the marker-free area of the calibration target with the displacement sensor, the measuring area located within a field of view of the RGB-D camera on the calibration target;
identifying a position of a measuring point within the measuring area projected by the displacement sensor on the calibration target with the RGB-D camera;
rotating the calibration target a known amount in relation to a location of the RGB-D device and the displacement sensor;
receiving output data from the RGB-D device including data from the RGB-D camera and the displacement sensor, the output data including depth measurements of the calibration target from both the RGB-D camera and the displacement sensor;
aligning data from the RGB-D camera and data from the displacement sensor;
calibrating intrinsic camera parameters and lens distortion of the RGB-D device based on known locations of the visual markers on the calibration target;
calibrating a relative configuration of the RGB-D camera and the displacement sensor based on aligned data output from the RGB-D device and known position information of the calibration target relative to the RGB-D camera and displacement sensor.

8. The method of claim 7, wherein aligning data from the RGB-D camera and data from the displacement sensor includes interpolating measurements of one of the RGB-D camera and displacement sensor.

9. The method of claim 7, wherein the plurality of visual markers on the calibration target are arranged in an array or known positions.

10. The method of claim 7, wherein the plurality of visual markers are shaped having a corner for ready identification of the visual markers by the RGB-D device.

11. A method of calibrating an RGB-D device having an RGB-D camera and a displacement sensor, the method comprising:
providing a calibration target, the calibration target including a plurality of visual markers shown in a surface of the calibration target, wherein the plurality of visual markers has known locations on the calibration target;
positioning the calibration target within a field of view of the RGB-D device such that the RGB-D camera and displacement sensor capture data corresponding to the calibration target;
locating one or more corners of the calibration target with the RGB-D device;
projecting a measuring point on a non-marked area of the calibration target with the displacement sensor, the measuring point located within a field of view of the RGB-D camera;
locating the projected measuring point of the displacement sensor projected onto the calibration target with the RGB-D camera;
rotating the calibration target by a defined rotation amount and recording output data from the RGB-D device corresponding to rotation of the calibration target relative to the RGB-D device; and solving an optimization problem of parameters of the RGB-D device to determine a relative relationship of the RGB-D device.

12. The method of claim 7, further comprising moving and rotating the calibration target and receiving data from the RGB-D device corresponding to additional movement and rotation of the RGB-D device.

13. The method of claim 11, wherein the plurality of visual markers on the calibration target are arranged in an array or known positions.

14. The method of claim 11, wherein the plurality of visual markers are shaped having a corner for ready identification of the visual markers by the RGB-D device.

* * * * *